(12) United States Patent
Green et al.

(10) Patent No.: US 10,965,763 B2
(45) Date of Patent: Mar. 30, 2021

(54) WEB ANALYTICS TAGS

(71) Applicants: Michelle Green, Berkeley, CA (US); Ryan Van Oss, Oakland, CA (US); Brian L. Mooneyham, Waxhaw, NC (US); Manuel Jasso, Alameda, CA (US); Aaron Armstrong, Knightstown, IN (US)

(72) Inventors: Michelle Green, Berkeley, CA (US); Ryan Van Oss, Oakland, CA (US); Brian L. Mooneyham, Waxhaw, NC (US); Manuel Jasso, Alameda, CA (US); Aaron Armstrong, Knightstown, IN (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 129 days.

(21) Appl. No.: 14/447,972

(22) Filed: Jul. 31, 2014

(65) Prior Publication Data
US 2016/0036930 A1 Feb. 4, 2016

(51) Int. Cl.
*G06F 15/173* (2006.01)
*H04L 29/08* (2006.01)
(Continued)

(52) U.S. Cl.
CPC .......... *H04L 67/22* (2013.01); *G06F 11/3438* (2013.01); *G06F 16/958* (2019.01); *G06F 2201/875* (2013.01)

(58) Field of Classification Search
CPC ......... H04L 67/22; H04L 67/02; H04L 67/26; H04L 67/2814; H04L 67/34;
(Continued)

(56) References Cited

U.S. PATENT DOCUMENTS 7,216,149 B1 5/2007 Briscoe et al.
7,249,315 B2 7/2007 Moetteli
(Continued)

FOREIGN PATENT DOCUMENTS

GB 2425194 A 10/2006

OTHER PUBLICATIONS

Richard Atterer, et al, Knowing the user's every move: user activity tracking for website usability evaluation and implicit interaction, Located Via Google Scholar, Proceedings of the 15th international conference on World Wide Web. ACM, 2006.
(Continued)

*Primary Examiner* — Glenton B Burgess
*Assistant Examiner* — Rachel J Hackenberg
(74) *Attorney, Agent, or Firm* — Walter Haverfield LLP; James J. Pingor (57) ABSTRACT

Systems and methods that facilitate capturing web analytics data are disclosed. One example method can include the acts of receiving a web page request from a client computer and providing the requested web page to the client computer. The requested web page can include one or more analytics tags. The method can also include capturing at least one of client side information, performance of, or one or more user interactions with the web page and providing the captured information to a web server associated with the web page. These interactions can include user actions that do not include a call to a web server, such as actions that occur during an AJAX flow.

18 Claims, 8 Drawing Sheets

(51) Int. Cl.
*G06F 11/34* (2006.01)
*G06F 16/958* (2019.01)

(58) Field of Classification Search
CPC ............ G06F 11/3438; G06F 17/3089; G06F 16/958; G06F 16/248; G06F 16/285; G06F 16/48; G06F 16/9038
See application file for complete search history.

(56) References Cited

U.S. PATENT DOCUMENTS

| | | | |
|---|---|---|---|
| 7,441,195 B2 | 10/2008 | Error et al. | |
| 7,523,191 B1 | 4/2009 | Thomas et al. | |
| 7,752,308 B2 | 7/2010 | Hutchinson | |
| 7,822,743 B2* | 10/2010 | Henkin | G06Q 30/0256 707/726 |
| 7,941,525 B1 | 5/2011 | Yavilevich | |
| 7,958,234 B2 | 6/2011 | Thomas et al. | |
| 8,359,313 B2 | 1/2013 | Mui et al. | |
| 8,452,865 B1 | 5/2013 | Heller et al. | |
| 8,600,790 B1 | 12/2013 | Peacock, III et al. | |
| 8,660,869 B2 | 2/2014 | MacLntyre et al. | |
| 8,671,089 B2 | 3/2014 | Yu et al. | |
| 10,552,299 B1* | 2/2020 | Surace | G06F 11/3672 |
| 10,628,630 B1* | 4/2020 | Surace | G06K 9/6267 |
| 2002/0147805 A1 | 10/2002 | Leshem et al. | |
| 2005/0102358 A1 | 5/2005 | Gold et al. | |
| 2005/0114658 A1* | 5/2005 | Dye | G06F 21/55 713/165 |
| 2007/0250618 A1* | 10/2007 | Hammond | G06F 17/30 709/224 |
| 2008/0046562 A1 | 2/2008 | Butler | |
| 2008/0275980 A1* | 11/2008 | Hansen | G06Q 30/02 709/224 |
| 2009/0171754 A1 | 7/2009 | Kane et al. | |
| 2012/0203889 A1 | 8/2012 | Carrabis | |
| 2013/0132833 A1* | 5/2013 | White | G06F 3/048 715/704 |
| 2013/0136253 A1* | 5/2013 | Liberman Ben-Ami | H04M 3/5191 379/265.09 |
| 2013/0290106 A1* | 10/2013 | Bradley | G06Q 90/20 705/14.64 |
| 2013/0339839 A1 | 12/2013 | Baran et al. | |
| 2014/0039995 A1* | 2/2014 | Ngo | G06O 30/0214 705/14.16 |
| 2014/0089472 A1* | 3/2014 | Tessler | H04L 67/02 709/219 |
| 2014/0143337 A1* | 5/2014 | McIntosh | H04L 67/02 709/204 |
| 2014/0281902 A1* | 9/2014 | Feuerlein | G06F 16/958 715/234 |
| 2015/0095487 A1* | 4/2015 | Kelly | H04L 67/22 709/224 |
| 2016/0019464 A1* | 1/2016 | Madhavan | G06F 17/30893 706/11 |

OTHER PUBLICATIONS

Jonathan R. Mayer, Third-party web tracking: Policy and technology, Located Via Google Scholar, Security and Privacy (SP), 2012 IEEE Symposium on. IEEE, 2012.

* cited by examiner

WEB ANALYTICS TAGS

BACKGROUND

Web analytics relates to the collection and analysis of information related to user interactions, performance, etc. with a web page. Information related to user interactions, performance, etc. with web pages can be used in a variety of ways, such as to assess and improve the web page, for market research, etc. Conventional web analytics includes techniques such as web server logfile analysis. Web server logfile analysis involves analysis of logfiles in which web servers maintain information related to transactions, and can include hits, page views, visits, user information, feature usage, and device detection. One conventionally available web server logfile capture and replay tool is Tealeaf®, which can provide some additional details and analysis about information passed to the server from a client.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises systems and methods that facilitate capturing web analytics data are disclosed. One example method can include the acts of receiving a web page request from a client computer and providing the requested web page to the client computer. The requested web page can include one or more analytics tags. The method can also include capturing at least one of client side information or one or more user interactions, performance, etc. with the web page and providing the captured information to a web server associated with the web page. These interactions can include user actions that do not include a call to a web server.

In another aspect, the subject innovation can include a system that can facilitate capturing web analytics data. One example system can include an analytics library that can include a plurality of analytics tags that can facilitate capture of web analytics data, a web page comprising a capture component. The capture component can include a selected set of the plurality of analytics tags, and the selected set can capture information associated with user interactions, performance, etc. with the web page. The system can also include a capture database that receives the captured information.

In yet another aspect thereof, the subject innovation can include further systems that can facilitate capture of web analytics data, and can include means for providing a requested web page to a client computer. The requested web page can include one or more analytics tags. Such a system can also include means for capturing at least one of client side information or one or more user interactions, performance, etc. with the web page and means for receiving the captured information.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component," "module," "system," "interface," and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Furthermore, the claimed subject matter can be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

The subject innovation relates to systems and methods that can facilitate providing analytic information related to sessions (e.g., user interactions, performance, etc.) with one or more web pages, web sites, application software, etc. (as used herein, the term "web page" includes web sites and/or portals accessible through browsers, through application software such as mobile applications, etc.). Conventional systems such as web log analysis software can capture analytic information such as details around user information, feature usage, and device detection. However, web log traffic alone is not accurate enough to capture a wide range of information that can be used for high-quality analytics, especially in applications that employ client side functionality. Analytics tags of the subject innovation can capture activity that takes place solely on a user device (e.g., computer, etc.), e.g., activity that does not include a web server call. In aspects, the subject innovation can be integrated with a content management system, avoiding the necessity of changing application code to make changes to data capture. Additionally, because of the capability of the subject innovation to capture dynamic elements, static IDs are not needed for each element being captured. In aspects, the subject innovation can provide for targeted data capture, allowing for a web site to be customized (e.g., via selection of particular analytics tags to include or not include, etc.) to specify which user inputs, performance data, etc. are to be captured, and which are not to be captured.

In aspects, systems and methods of the subject innovation can employ any of a plurality of analytics tags to facilitate collection of information regarding user interactions, performance, etc. with one or more web pages. In various embodiments, these analytics tags can be implemented, for example, via Java, .NET, or a similar platform, and can be maintained in a JavaScript library, etc., which can be used in combination with custom HTML (hypertext markup language) tags. Analytics tags in accordance with aspects of the subject innovation can advance the ability to capture information regarding how users interact with various web pages, non-interaction data associated with web sessions (e.g., performance, etc.), as well as characteristics about the users and their sessions. As the Internet moves to increasing implementation of features such as AJAX (originally an acronym for Asynchronous JavaScript and XML, although XML need not be employed and requests need not be asynchronous), client-side features, dynamic environments, etc., web logs will have increasing gaps in their data. The subject innovation can fill these gaps, by providing for capture of dynamic elements, client-side actions, actions that occur during AJAX flows that do not involve web server calls, performance metrics, etc.

Figure 1:
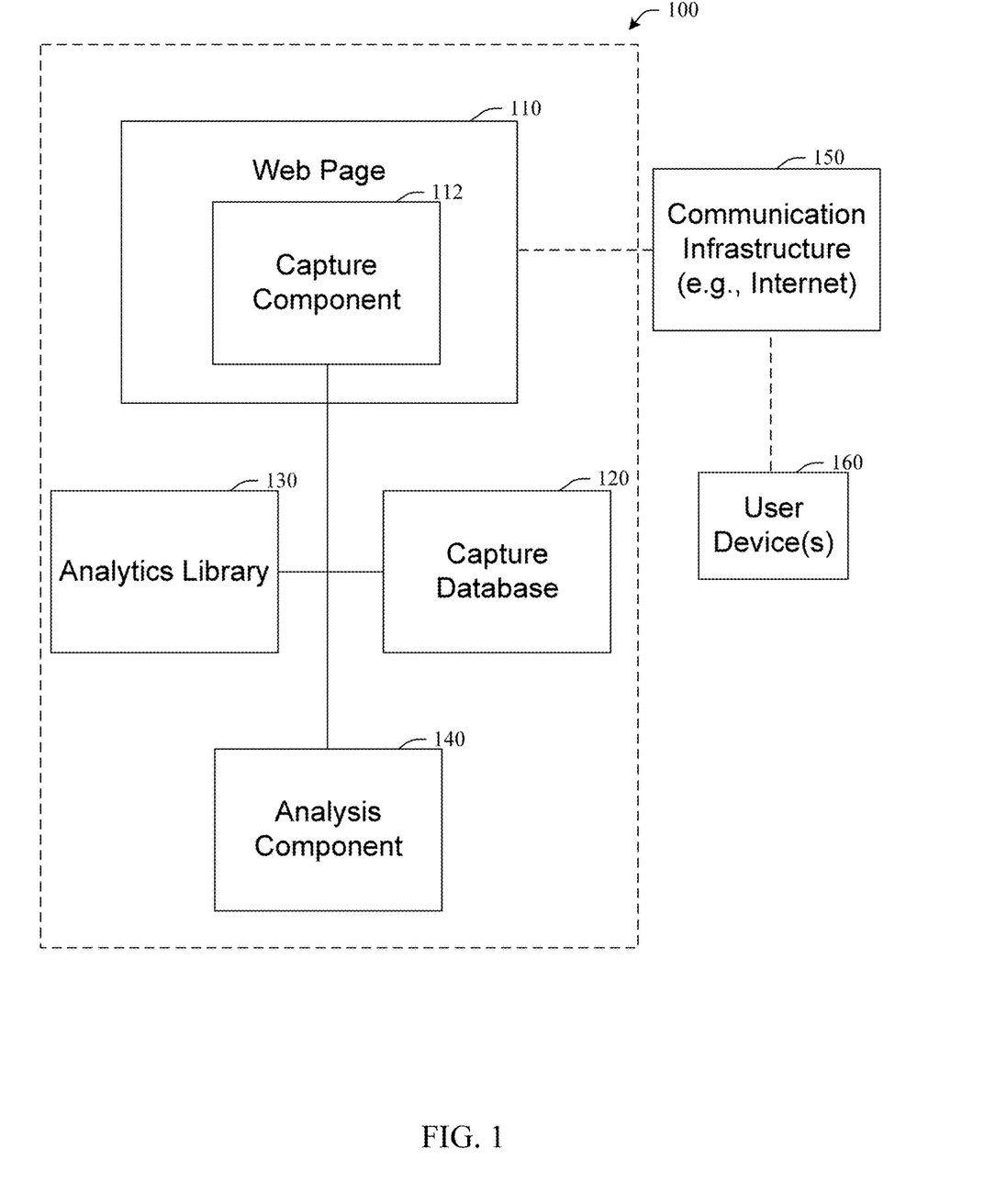
FIG. 1 illustrates a system that can facilitate capture of user interactions, performance, etc. in accordance with various embodiments of the subject innovation.

Referring initially to the drawings, FIG. 1 illustrates a system 100 that can facilitate capture of user interactions, performance, etc. in accordance with various embodiments of the subject innovation.

System 100 can include a web page 110 that can comprise a capture component 112. Capture component can comprise one or more analytics tags (e.g., custom tags that are not part of the HTML specifications, etc.) such as those discussed herein, wherein analytic information associated with the web page are captured by the one or more analytics tag. This analytic information can include feature usage, device detection, user interactions, performance, etc. (e.g., one or more user actions (or inactions), etc.), other user information, etc. In various embodiments, analytics tags of the subject innovation can comprise JavaScript tags or similar tags, and can monitor user interaction with elements of the web page. In aspects, an analytics tag of the subject innovation can monitor one or more web page elements (e.g., buttons, fillable fields, drop downs, hover boxes, help buttons, etc.) to determine if and when one or more user actions occurs (or does not occur, or how many times such actions occur), such as mouse clicks, selections, mouseovers, entries into fields, touch inputs (e.g., tap, swipe, multi-finger inputs such as pinches, etc.), etc. Capture component 112 can be designed (or redesigned) to monitor any user interactions, performance, etc. with elements of the web page, such as those selected by a designer of the web page, a default set of interactions based on web page elements, etc.

In various aspects, analytics tags of the subject innovation can identify substantially any user interaction, performance information, etc., and provide for capture of that information. This information can be captured, for example, by creating a request and response pair for such events, performance information, etc., such that it can be captured by passive web log capture software. In some aspects, an administrative console can be included that can provide for the ability to select which tags will or will not be activated. For example, certain tags related to capturing information related to performance, network traffic, etc., can be activated in a troubleshooting application, but need not be activated in all applications.

The captured user interactions, performance, etc. can be stored in a capture database 120, and these interactions can be used in a variety of applications, such as in similar ways to conventional web analytics (e.g., market research; customized or personalized responses; web page redesign, customization, personalization; etc.). In various aspects, system 100 can provide for reporting on capture database 120, such as the ability to report on contents of analytics tags; e.g., reporting on some or all of the tag values for each of the parameters; in other aspects, the subject innovation can interface with conventional systems, such that the analytical and reporting capabilities of such conventional systems can be used in conjunction with the additional information capturable via the subject innovation. In various embodiments, these reporting aspects can facilitate searching for analytics tag values, finding and replacing analytics tags values, filtering of tag values, exporting tag values to any of a variety of formats (e.g., database, spreadsheet, etc.).

In aspects, analytics tags of the subject innovation can be selected from an analytics library 130, which can maintain a plurality of analytics tags (and associated implementable code, etc.), for example, in a JavaScript library (or in any of a variety of other forms, such as iOS, Android, thick client, etc.), useable in connection with web site 110 (or with other web sites, etc.). Analytics library 130 can maintain analytics tags associated with elements or types of elements of web page 110 (or with other web sites, etc.), for example, tags associated with various user actions that can be taken in connection with associated elements or types of elements, etc. As such, capture component 112 can be readily customized or re-customized based on selection or re-selection of analytics tags from analytics library 130.

In some aspects, analytics tags of capture component 112 can be included via changes to the application software associated with web page 110. However, in other aspects, content management system 140, which manages content associated with web page 110, can associate analytics tags of capture component 112 with content of web page 110, such that changes can be made to the content captured by capture component 112 without affecting the functionality of web page 110. For example, changes can be made through the content management system as to what events, characteristics, metrics, etc. to monitor, as well as to what information to send regarding those events, characteristics, metrics, etc.

Optionally, system 100 can also include an analysis component 150 that can analyze the captured user interactions, performance, etc. (alone or in connection with other captured user interactions, performance, etc. that can be maintained in capture database 120, etc.) and implement an appropriate response. Analysis component 150 can provide customized responses based on recent or historical user interactions, performance, etc. with the web page, and can determine patterns in user interactions, performance, etc. and can present or reconfigure web sites (including web site 110) to anticipate actions users may take (e.g., if a user always scrolls down a list of accounts to interact with a particular account, the list can be automatically reordered to present that particular account higher in the list, etc.). This analysis can include current and/or historical interactions undertaken by a particular user, by other users, or combinations thereof. In another example, if a customer interacts with a help system or a customer service representative (e.g., via a live chat, etc.), recent user interactions, performance, etc. can be provided to the help system or representative by analysis component 150, as these interactions are likely to be associated with the reason for the interaction with the help system or representative.

Users can interact with system 100 via a communication infrastructure 160 (e.g., the Internet, an intranet, etc.), which can be accessed via a user device 170. After a user accesses web page 110, capture component 112 can capture monitored user interactions, performance, etc. even if they do not initiate a web call, or in some aspects (e.g., mobile applications, etc.), even if they occur entirely offline or locally to user device 160, which can then be returned to system 100 (e.g., in a next Uniform Resource Locator (URL) call, etc.).

In aspects, analytics tags of the subject innovation can allow for tracking of AJAX flows in addition to page flows, in contrast to conventional systems. Analytics tags of the subject innovation can use HTTP GET or POST for transport, and can allow for the passing of arbitrary values, e.g., in the URL (which can be encrypted when running in SSL, etc.) (e.g., as key and value pairs, etc.), etc. In various embodiments, an analytics tag of the subject innovation can include a JavaScript (or other alternatives discussed herein, etc.) API that can be invoked at any point during page flows or during AJAX, etc. flows (e.g., which can occur at any point in time and for substantially any user event, etc.), as well as an associated HTML tag.

In aspects, data sent to a system of the subject innovation can be sent as query parameters appended to an HTTP GET or POST request. In some aspects, a first (non-empty) set of analytics tags can be included as default tags, which can be supplemented by a second set (which can be empty) of analytics tags as custom tags. In various aspects, failure to provide values for any of the first set of analytics can send the analytics request to a "missing" endpoint, whereas failure to provide values for any or all of the second set need not affect the endpoint. In various aspects, the first set of analytics tags can include tags that capture one or more of login credentials, functions used, channel used, etc. For example, fields that the first set of analytics tags may capture include CompanyID, UserID, Product, Channel, Feature, Type, KVer (e.g., key version), Timestamp, etc.

Figure 2:
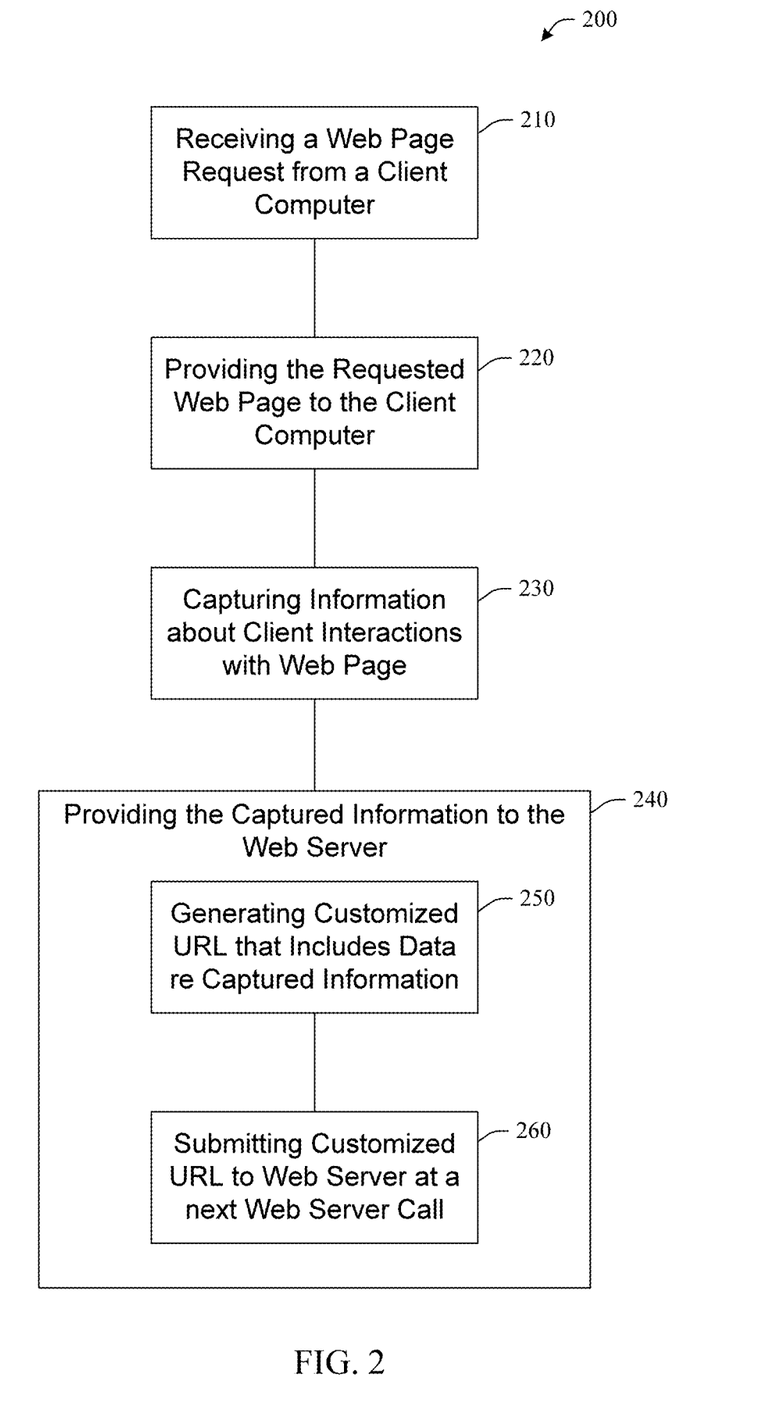
FIG. 2 illustrates a method of facilitating collection of web analytics data in accordance with aspects of the subject innovation.

FIG. 2 illustrates a method 200 of facilitating collection of web analytics data in accordance with aspects of the subject innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Method 200 can include the act of receiving a web page request from a client computer 210, and the act of providing the requested web page to the client computer 220. In accordance with various aspects of the subject innovation, the code for the web page can include one or more analytics tags (e.g., HTML tags, etc.) that can gather client side information and/or user interactions, performance, etc. with the web page, which can include client-side actions, which can include client-side actions that are independent of or not include a call to a web server associated with the web page. At 230, method 200 can include capturing information associated with at least one of the client or one or more interactions between the client and the web page. Additionally, method 200 can include, at 240, providing the captured information to the web server. In some embodiments, act 240 can include the acts of 250, generating a customized URL that includes data based at least in part on the captured information, and 260, the customized URL can be submitted to the web server via a subsequent web server request (e.g., HTTP GET or POST, etc.).

In various embodiments, analytics tags in accordance with aspects of the subject innovation can be selected from a set of standard analytics tags and an optional set of custom analytics tags (e.g., both of which can be stored in an analytics library such as analytics library 130). Tags from one or more of these sets can be used during page loads, during client-side events, or during both. The set of standard analytics tags can include tags that can capture Product, Feature, Channel, Type, KVer (e.g., which can indicate a key or tag version, etc.), Timestamp, CompanyID, UserID, etc.; the set of custom analytics tags can include tags that can capture form data, click events, hover events, focus events, etc.

In various aspects, the subject innovation can provide for the ability to add, modify, or delete analytics tags without requiring code changes to the individual application or web page associated with the tags. For example, a Wire Transfer analytics tag can be added, modified, or deleted, without needing to change the associated Wire Transfer application code or pages. The associated applications can include any channel, application, system, product, etc. that the analytics tags have been included in, and can include, web pages, mobile pages, app-based portals, underlying applications, etc.

In additional aspects, the subject innovation can provide the ability to add, modify, or delete other HTML tags, including but not limited to, tags associated with 41st Parameter, Silver Tail, Tealeaf, etc., without requiring code changes to the individual application. For example, a Wire Transfer HTML tag can be modified, added, deleted, etc. without needing to change the Wire Transfer application code or pages.

In further aspects, the analytics tags of the subject innovation can be added, modified, or deleted independently of development of or the release cycle of the application or web page they are tied to.

The following are example scenarios showing example implementations of values collected via analytics tags of the subject innovation being returned via a URL. In a first example, a user application screen can be loaded by a user, and a basic analytics event can be registered indicating the user has accessed this functionality, for example, with the following key and value pairs in the URL: prdt=Wire Transfer&ftr1=Initiate Wires&ftr2=Single Wire&ftr3=Book Transfer&ftr4=Entered&chn1=CEO Portal&chn2=CEO Portal&chn3=CEO Portal&typ1=Product&typ2=Product&typ3=Product&tm=1320865457055&kver=1.0. In a second example, a user can trigger the same event three times within an application screen, and a timestamp attribute can distinguish among the three occurrences of the same event, with different returned values (e.g., tm=132086545705, tm=1320898349349, tm=1335928345280, etc.). In a third example, analytics code can be added to record details of wires transactions; the non-standard attributes can be included in the analytics key/value pairs such as in &template_name=BANCFIRST M/O—Wire to Banc First for M/O clearing&credit_currency=USD&value_date=10/18/2011&wire_amount=11250.56. In a fourth example, a new set of "standard keys" (e.g., associated with a new set of analytics tags, etc.) can be defined and an application team can choose to use the new key set for coding analytics; the "kver" key has the new key set version of "2.0", as in kver=2.0.

In aspects, the subject innovation can capture analytic data associated with user login and logout. For example, browser capability data can be logged upon a user logging into a web page or portal, and some or all of the following information can be captured: values contained in the JavaScript (or alternative, etc.) "navigator" object, values contained in the JavaScript (or alternative, etc.) "screen" object, capabilities detected by the Modernizr JavaScript library, etc. At logout, information can be captured associated with the method of logout, such as whether it was explicitly initiated by the user, the result of a session timeout, etc.

The following are example login and logout scenarios showing example implementations of values collected via analytics tags of the subject innovation being returned via a URL. In a first example, a user logs into a web portal, and the subject innovation records the following Javascript "navigator" object values: &appcodename=Mozilla & appname=Netscape&appversion=CodeName: 5.0 (Windows NT 5.1) AppleWebKit/535.7 (KHTML, like Gecko) Chrome/16.0.912.63 Safari/535.7 &cookieenabled=true& platform=Win32&useragent=CodeName: Mozilla/5.0 (Windows NT 5.1) AppleWebKit/535.7 (KHTML, like Gecko) Chrome/16.0.912.63 Safari/535.7. In a second scenario, a user logs into a web portal, and the subject innovation records the following JavaScript "screen" object values: &availheight=900 &availwidth=1400& colordepth=32&height=900&pixeldepth=32&width=1400. In a third example, a user logs in and the subject innovation records the following values detected through the Modernizr JavaScript library: &canvastext=true &draganddrop=false& hashchange=false&history=true&audio=false& . . . etc. In a fourth example, a user logs out of a web portal by explicitly clicking the logout button, and the subject innovation records an analytics event: ?prdt=CEO Logout&ftr1=user. In a fifth example, a user is logged out of a web portal as a result of the session timeout, and the subject innovation records the analytics event: ?prdt=CEO Logout&ftr1=timeout.

The following are a series of use cases provided as example applications of the subject innovation. The subject innovation can include an analytics library that can provide analytics tags that can be invoked by any web page to capture data associated with devices, browsers, user actions, etc. The collected data can include feature detection (e.g., CSS3, touch, etc.) and/or general browser data (e.g., screen size, etc.). The analytics tags can be invoked at any of a variety of times, such as upon user login (e.g., to capture information as early in a user session as possible, etc.). On invocation, analytics tags of the subject innovation can capture and subsequently transmit any of a variety of data, including, but not limited to: company ID and user ID data; page description data provided by the implementing application (e.g., by having set an object property, by supplying a function parameter, etc.), a time value (e.g., in milliseconds) indicating how long data collection lasted, JavaScript (or alternative, etc.) client-side timestamp, a version number of the analytics tags key set (e.g., 1.0, etc.), and/or other feature and browser attributes listed herein, etc. This data can be transmitted to an application-configured analytics endpoint, which can be based on an application-specific configuration file. The execution time of the data collection can be minimized so as to have the least necessary impact on system users. In a sample execution, a user can arrive at an application landing page immediately after logging in, and analytics data transmission can be triggered by some event, such as the user clicking a "log features" button. Additionally, as described herein, analytics data can continue to be captured throughout user interaction with the web page.

In a second use case, the analytics library can provide code that can be invoked on page load to do a one-time scan for analytic tags. The analytics tags can comprise custom HTML elements that will not render, and the name of the tags to be searched for can be configurable at run-time. On invocation, the analytics code can search page content and collect and transmit to an application-configured analytics endpoint the following data for each instance of a custom HTML analytics tag found in the page: company ID and user ID data, page description data embedded in the custom analytics HTML tag (e.g., "<wfceoa prdt=" "ftr=" "chn=" "typ=" "kver=" "/>"), JavaScript (or alternative, etc.) client-side timestamp, etc. The name of the of the custom HTML tag can be specified as part of the invocation as a function parameter. The analytics endpoint can be based on an application-specific configuration file, and the execution time of the data collection can be minimized so as to have the least necessary impact on system users. In a sample execution, the user can arrive at an application page that contains a custom HTML analytics tag, and an analytics library can be invoked upon page load. In another sample execution as a variation on the second use case, a user can arrive at an application page containing a plurality (e.g., 5, etc.) of distinct instances of custom HTML analytics tags, and the analytics library can invoke the plurality of distinct tags upon page load.

In a third use case, the analytics library can provide code that can be invoked by application teams based upon any client-side event. The analytics code can accept a custom set of analytics data. On invocation, the analytics code can collect and transmit to an application-configured analytics endpoint the following data: company ID and user ID data, page description data provide by the application team invoking the analytics code (e.g. "{"prdt":"analytics reference implementation", "ftr":"analytics,custom tag,onload", "chn":"wfria documentation","typ":"test","kver":"1.0"}"), JavaScript (or alternative, etc.) client-side timestamp, etc. The analytics endpoint can be based on an application-specific configuration file, and the execution time of the data collection can be minimized so as to have the least necessary impact on system users. In a sample execution, a user can arrive at an application page that includes analytics code, and can trigger an event that also causes analytics data capture to be invoked via clicking a page link. In another sample execution as a variation on the third use case, a user can arrive at an application page that includes analytics code, and can trigger an event that also causes analytics data capture to be invoked via clicking an input button, which can additionally cause collection and transmission of custom data specific to the application use case, web form, etc. (e.g., "{"firstname":"John","lastname":"Doe", "favoritenumber": "21"}").

Figure 3:
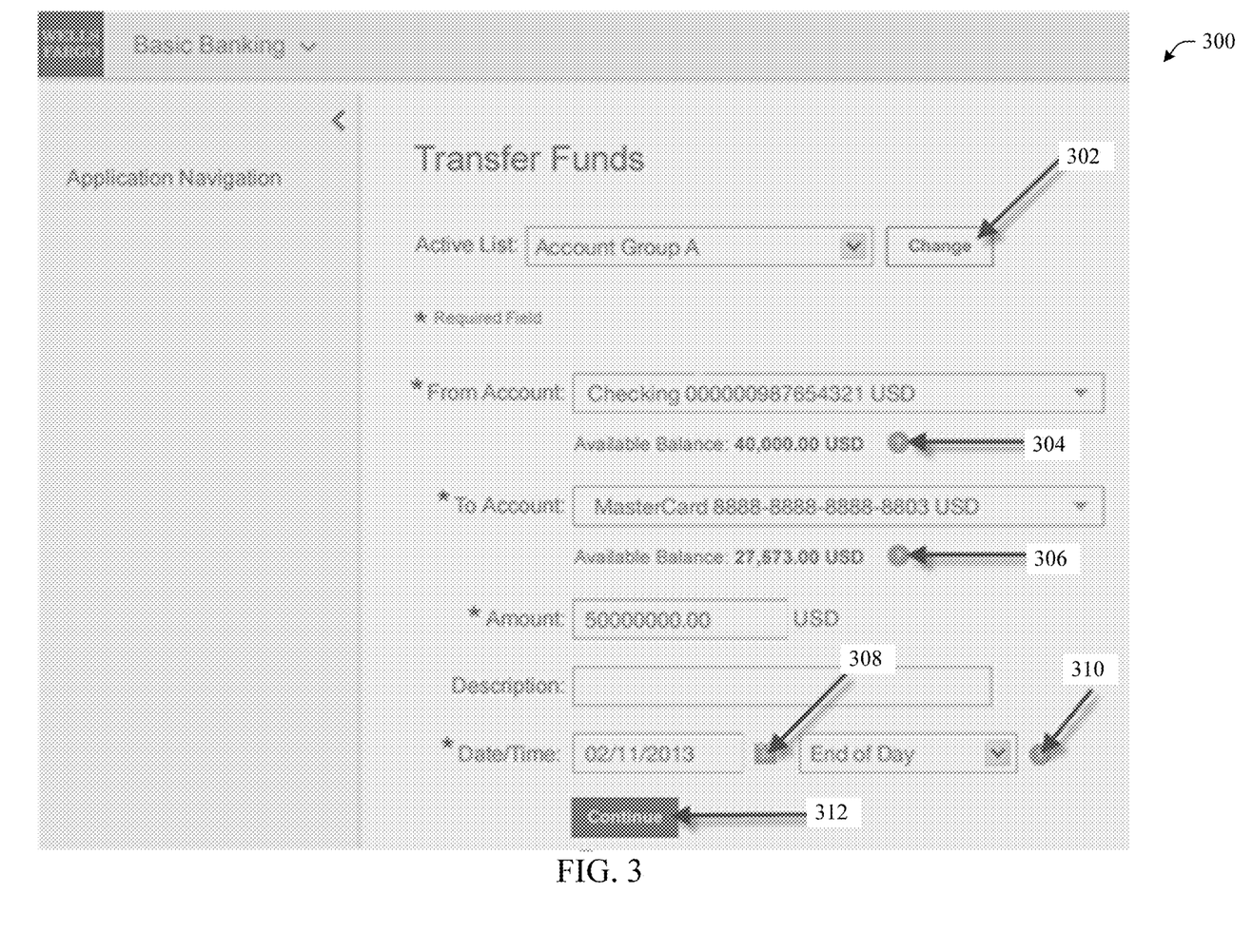
FIG. 3 illustrates an example screenshot of a transfer funds screen, showing where information can be captured via analytics tags employable in connection with aspects of the subject innovation.
Figure 4:
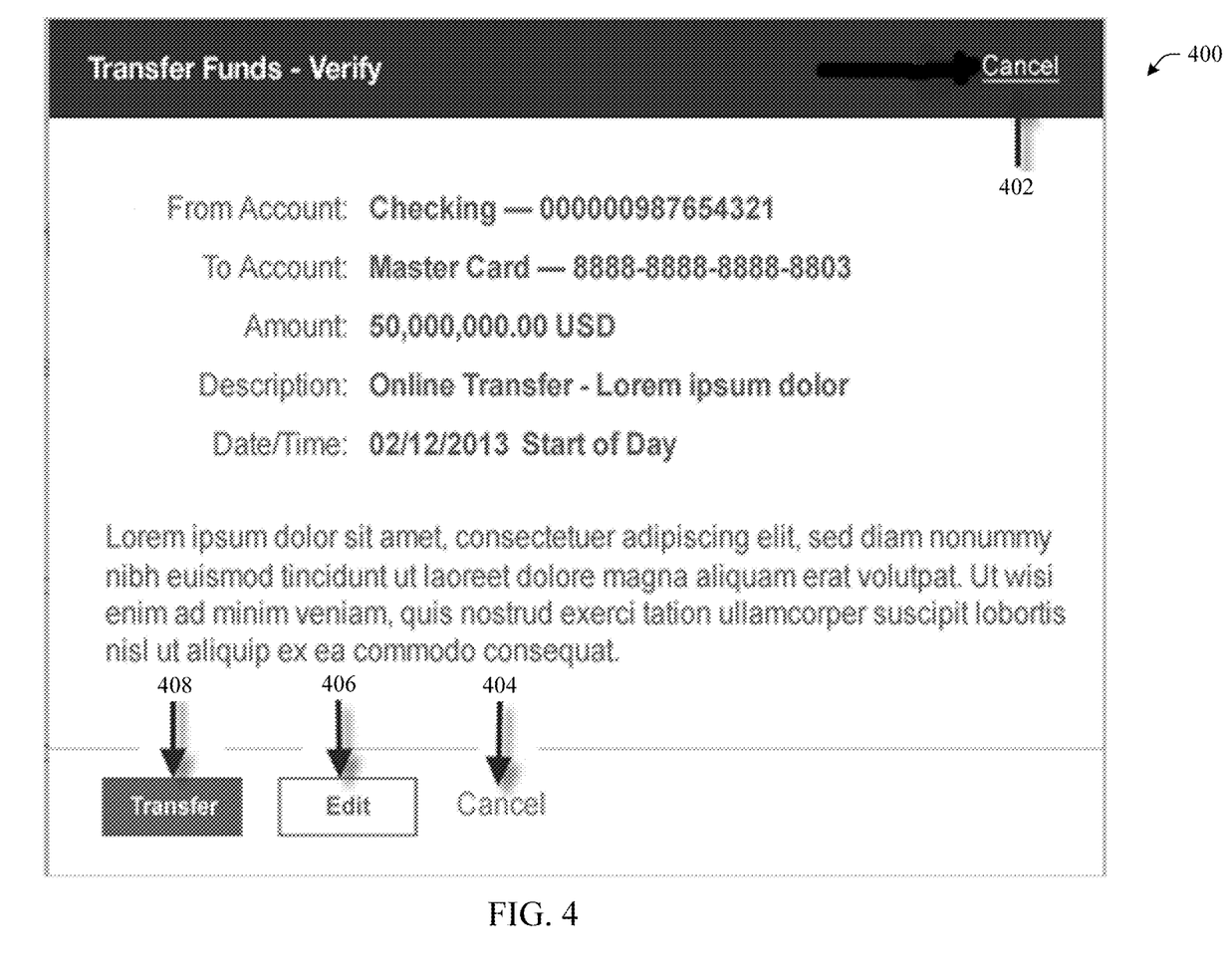
FIG. 4 illustrates an example screenshot of a verification screen, showing where information can be captured via analytics tags employable in connection with aspects of the subject innovation.
Figure 5:
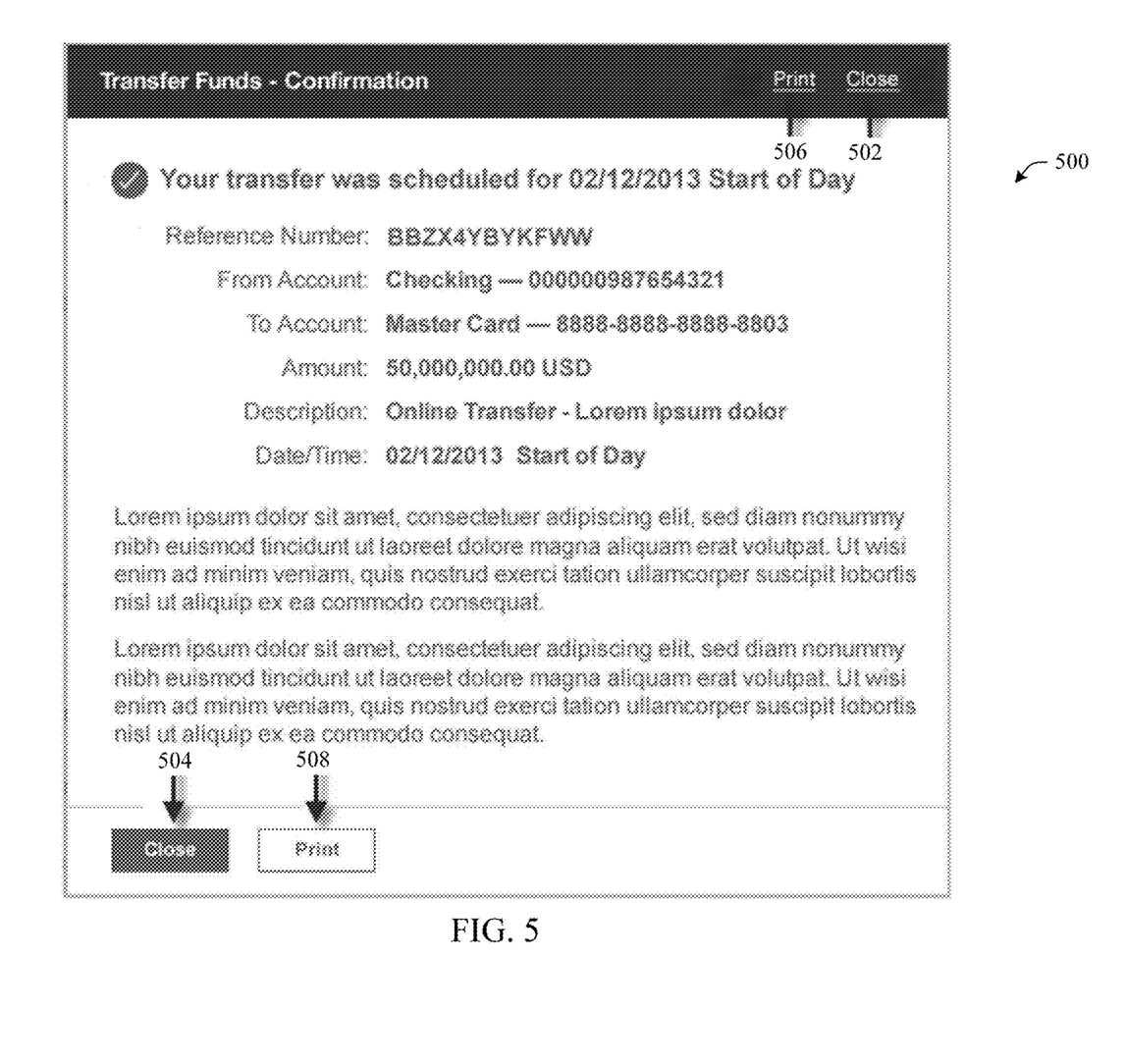
FIG. 5 illustrates an example screenshot of a confirmation screen, showing where information can be captured via analytics tags employable in connection with aspects of the subject innovation.

FIGS. 3-5 illustrate example screenshots of a banking transaction, indicating information that can be captured via the analytics tags employable in connection with the subject innovation, which can include substantially any user action (or inaction) in connection with a web page. In contrast to conventional systems, the subject innovation can provide for the collection of this information without necessitating redesign of application software specifically to provide points in process flows (e.g., additional web server calls, etc.) such that information can be collected, and the subject innovation can additionally provide for collection of information that conventional systems cannot capture. Each of these screenshots indicates additional information that can be readily collected (or not) via systems and methods of the subject innovation without redesign of the web page, in contrast to conventional systems. FIG. 3 shows an example screenshot 300 of a transfer funds screen, showing where information can be captured via analytics tags employable in connection with aspects of the subject innovation, such as when an active list is changed as at 302, when balance disclaimers are utilized as at 304 and 306, when a calendar module is called as at 308 and 310, and when form information can be captured as at 312. FIG. 4 illustrates an example screenshot 400 of a verification screen, showing where information can be captured via analytics tags employable in connection with aspects of the subject innovation, such as when a transaction gets canceled as at 402 or 404, edited as at 406, or verified as at 408. FIG. 5 illustrates an example screenshot 500 of a confirmation screen, showing where information can be captured via analytics tags employable in connection with aspects of the subject innovation, such as if a user closes (as at 502 or 504) or prints (as at 506 or 508) the confirmation page, and can also determine if the user prefers to use links from the panel header as at 502 or 506 or buttons from the panel footer as at 504 or 508.

Figure 6:
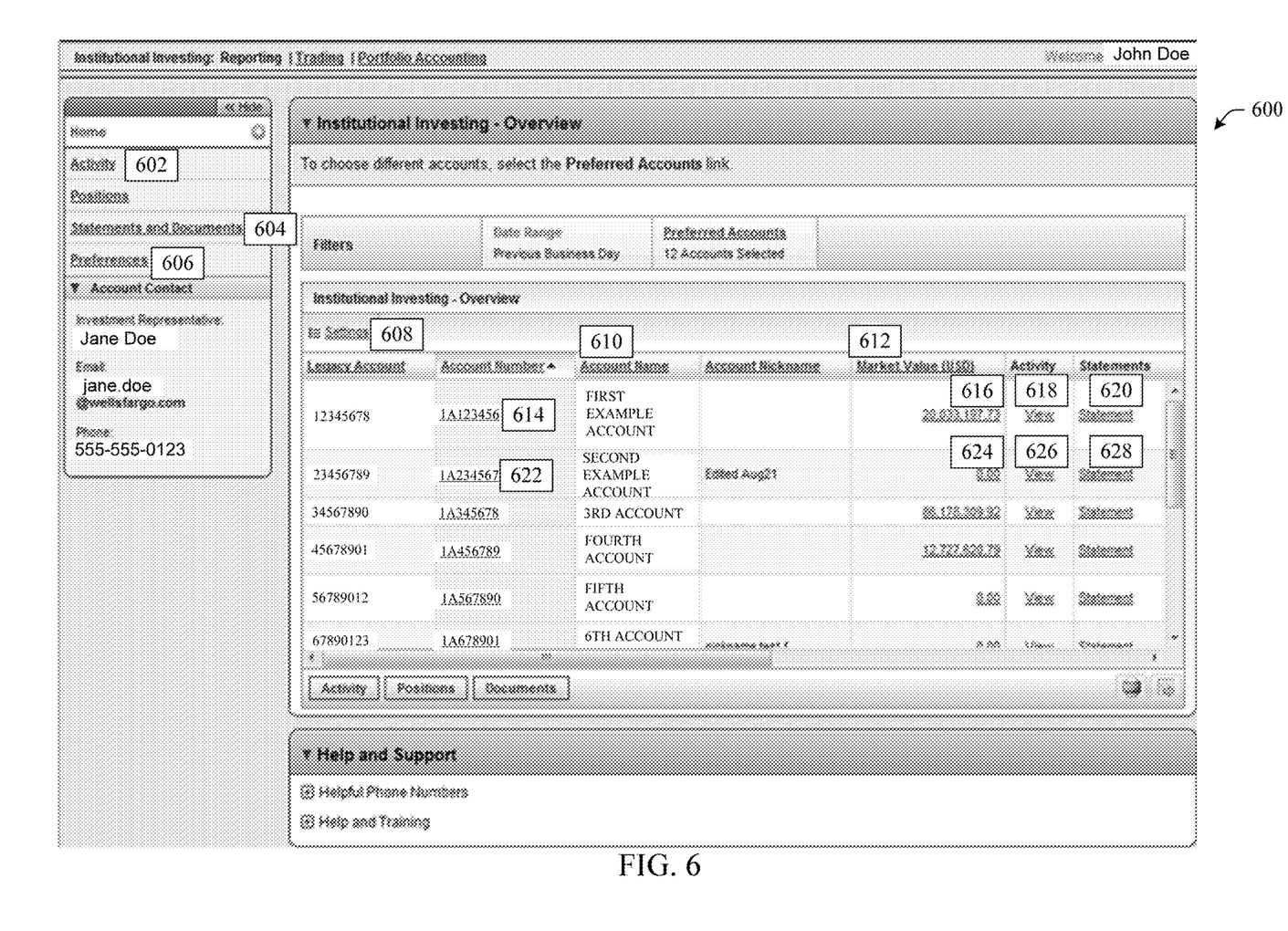
FIG. 6 illustrates an example screenshot of a homepage for investment accounts, showing fourteen example actions captureable in connection with systems and methods of the subject innovation.

FIG. 6 illustrates an example screenshot 600 of a homepage for investment accounts, showing fourteen example actions 602-628 captureable in connection with systems and methods of the subject innovation: selecting account activity at 602, selecting statements and documents at 604, selecting preferences at 606, selecting settings associated with the account overview at 608, sorting by account name at 610, sorting by market value at 612, selecting accounts at 614 or 622, selecting account values at 616 or 624, viewing account activity at 618 or 626, or viewing statements at 620 or 628. Of these fourteen actions, one example conventional system, could not capture any of these actions in its unmodified form. The example conventional system in combination with its SDK (software development kit) can capture static (non-dynamic) content, which for the example web page of screenshot 600, covers actions 602-608. Dynamic content such as interactions with the table of information shown and the specific communication center messages were not captureable via the conventional system with its SDK. As used in conjunction with XPath and custom coding developed in connection with the subject innovation, the functionality of the conventional system was extended to capture interaction with the column headers of the table, such as 610 and 612, but not interaction with the table content. However, the subject innovation can facilitate capturing interactions with any of 602-628, and can be used in conjunction with conventional systems such as Tealeaf®.

Embodiments of the subject innovation can utilize templates and standard code, and take advantage of a library of analytics tags such as that described herein, which can be re-used in a wide variety of settings, providing for more efficient coding via the subject innovation's potential for re-use and inclusion without substantial modification to the functionality of the web page. Systems and methods of the subject innovation captures what a user does when interacting with the web page, in contrast with conventional systems, which may require extensive configuration on a per event basis to capture events, may require additional coding of the application to capture events, and still cannot capture the full range of events and information captureable by the subject innovation.

The inclusion of analytic tags in accordance with aspects of the subject innovation does not adversely impact web page performance, requires comparable or lesser overhead when compared to conventional systems. In situations that have been tested, substantially more information was passed by TeaLeaf® in reporting on what loaded on a given page than by the analytics tags of the subject innovation in reporting on user actions that occurred.

Figure 7:
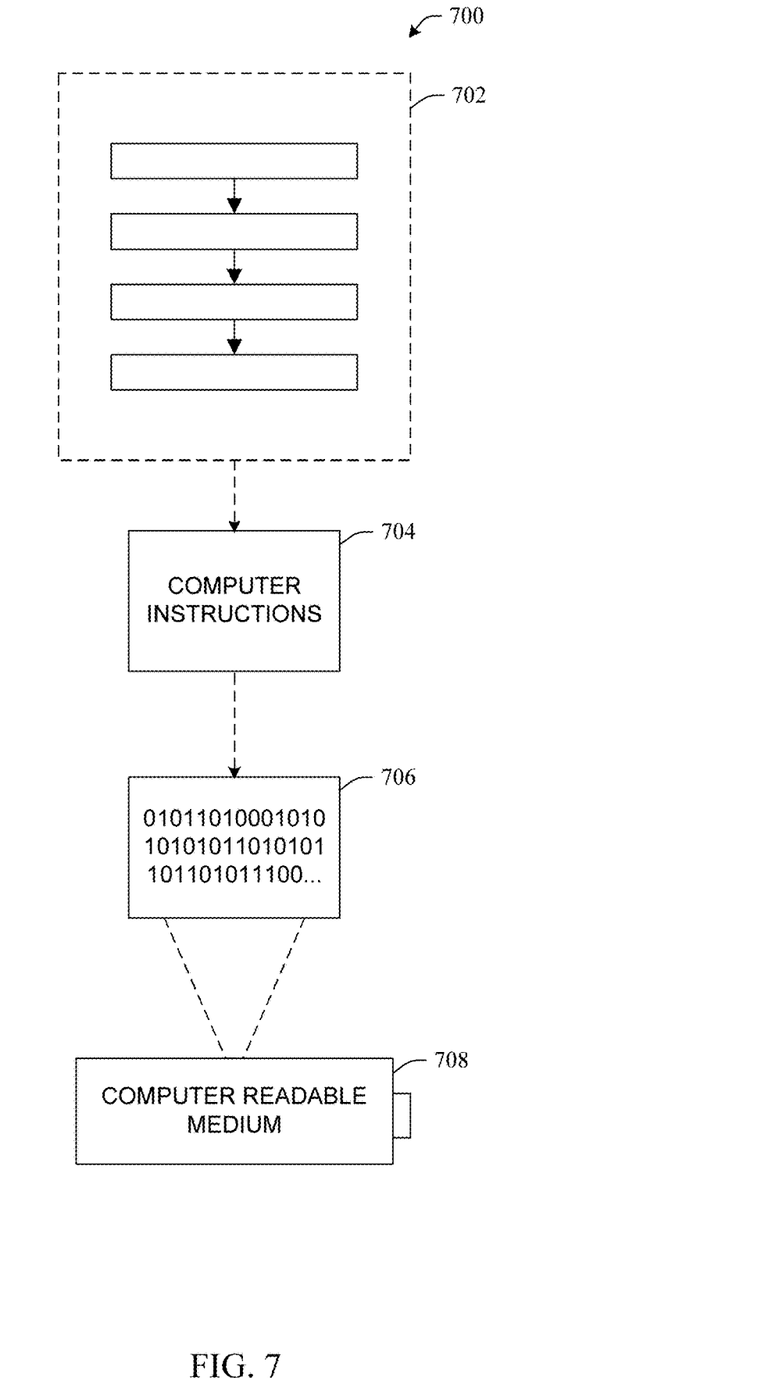
FIG. 7 illustrates a computer-readable medium or computer-readable device comprising processor-executable instructions configured to embody one or more of the provisions set forth herein, according to some embodiments.

Still another embodiment can involve a computer-readable medium comprising processor-executable instructions configured to implement one or more embodiments of the techniques presented herein. An embodiment of a computer-readable medium or a computer-readable device that is devised in these ways is illustrated in FIG. 7, wherein an implementation 700 comprises a computer-readable medium 708, such as a CD-R, DVD-R, flash drive, a platter of a hard disk drive, etc., on which is encoded computer-readable data 706. This computer-readable data 706, such as binary data comprising a plurality of zero's and one's as shown in 706, in turn comprises a set of computer instructions 704 configured to operate according to one or more of the principles set forth herein. In one such embodiment 700, the processor-executable computer instructions 704 is configured to perform a method 702, such as at least a portion of one or more of the methods described in connection with embodiments disclosed herein. In another embodiment, the processor-executable instructions 704 are configured to implement a system, such as at least a portion of one or more of the systems described in connection with embodiments disclosed herein. Many such computer-readable media can be devised by those of ordinary skill in the art that are configured to operate in accordance with the techniques presented herein.

Figure 8:
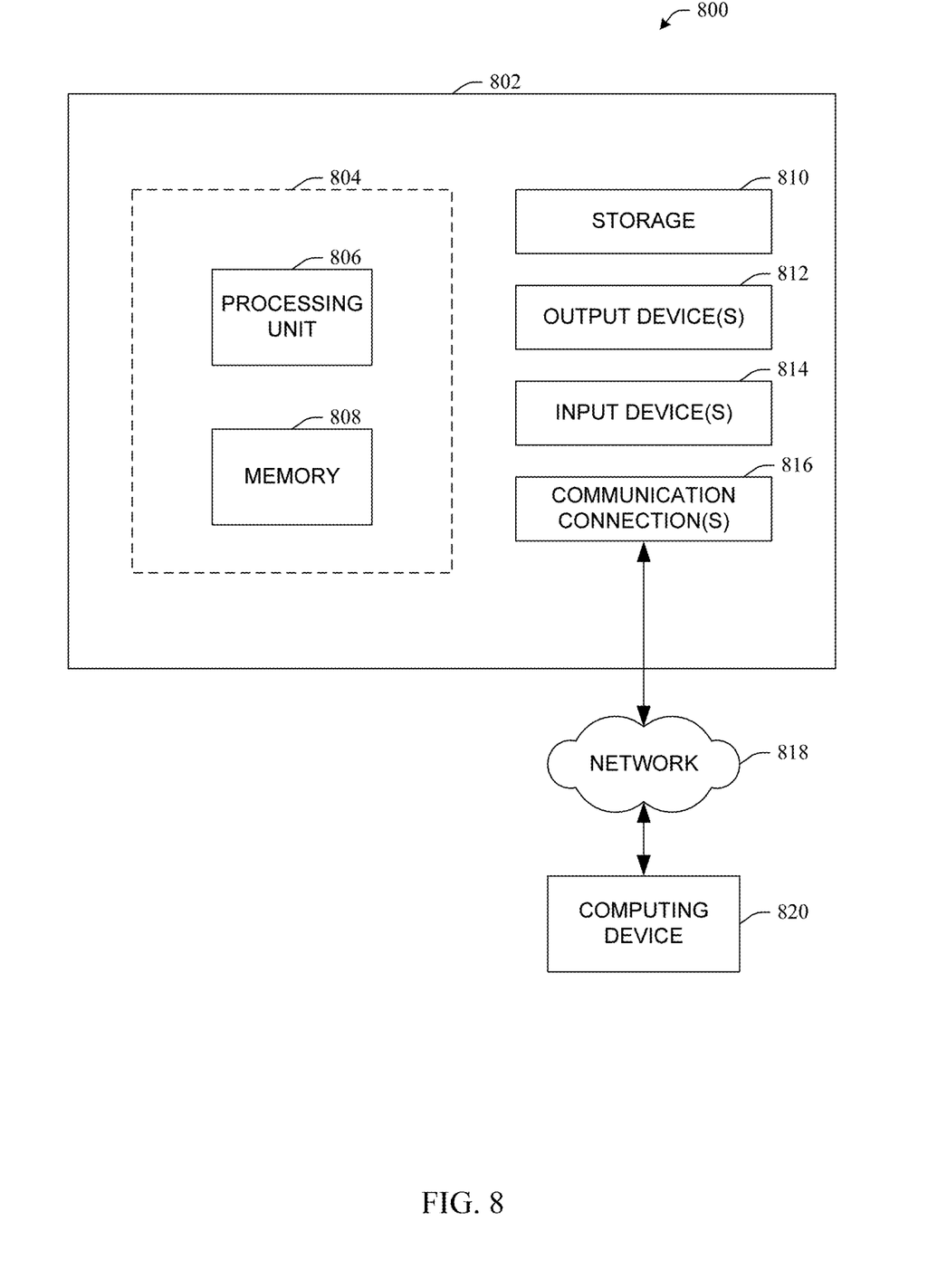
FIG. 8 illustrates a computing environment where one or more of the provisions set forth herein can be implemented, according to some embodiments.

FIG. 8 and the following discussion provide a description of a suitable computing environment in which embodiments of one or more of the provisions set forth herein can be implemented. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, tablets, and the like, multiprocessor systems, consumer electronics, mini computers, mainframe computers, distributed computing environments that include any of the above systems or devices, and the like.

Generally, embodiments are described in the general context of "computer readable instructions" being executed by one or more computing devices. Computer readable instructions are distributed via computer readable media as will be discussed below. Computer readable instructions can be implemented as program modules, such as functions, objects, Application Programming Interfaces (APIs), data structures, and the like, that perform particular tasks or implement particular abstract data types. Typically, the functionality of the computer readable instructions can be combined or distributed as desired in various environments.

FIG. 8 illustrates a system 800 comprising a computing device 802 configured to implement one or more embodiments provided herein. In one configuration, computing device 802 can include at least one processing unit 806 and memory 808. Depending on the exact configuration and type of computing device, memory 808 may be volatile, such as RAM, non-volatile, such as ROM, flash memory, etc., or some combination of the two. This configuration is illustrated in FIG. 8 by dashed line 804.

In these or other embodiments, device 802 can include additional features or functionality. For example, device 802 can also include additional storage such as removable storage or non-removable storage, including, but not limited to, magnetic storage, optical storage, and the like. Such additional storage is illustrated in FIG. 8 by storage 810. In some embodiments, computer readable instructions to implement one or more embodiments provided herein are in storage 810. Storage 810 can also store other computer readable instructions to implement an operating system, an application program, and the like. Computer readable instructions can be loaded in memory 808 for execution by processing unit 806, for example.

The term "computer readable media" as used herein includes computer storage media. Computer storage media includes volatile and nonvolatile, removable and non-removable media implemented in any method or technology for storage of information such as computer readable instructions or other data. Memory 808 and storage 810 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 802. Any such computer storage media can be part of device 802.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 802 can include one or more input devices 814 such as keyboard, mouse, pen, voice input device, touch input device, infrared cameras, video input devices, or any other input device. One or more output devices 812 such as one or more displays, speakers, printers, or any other output device can also be included in device 802. The one or more input devices 814 and/or one or more output devices 812 can be connected to device 802 via a wired connection, wireless connection, or any combination thereof. In some embodiments, one or more input devices or output devices from another computing device can be used as input device(s) 814 or output device(s) 812 for computing device 802. Device 802 can also include one or more communication connections 816 that can facilitate communications with one or more other devices 820 by means of a communications network 818, which can be wired, wireless, or any combination thereof, and can include ad hoc networks, intranets, the Internet, or substantially any other communications network that can allow device 802 to communicate with at least one other computing device 820.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    an analytics library comprising a plurality of analytics tags that facilitate capture of web analytics data;
    a web page that is loaded during a first web server request, wherein the analytics library provides code that is invoked on page load to do a one-time scan for analytic tags, the web page comprising a capture component, wherein the capture component comprises a selected set of the plurality of analytics tags, wherein the selected set captures information associated with at least one of performance of or user interactions with the web page and dynamically generates a custom URL based at least in part on the captured information during the at least one of performance of or user interactions with the web page, wherein the custom URL contains text in the custom URL that indicates the captured information,
    wherein on invocation the analytics code searches page content and collects and transmits data to an application-configured analytics endpoint, wherein the analytics endpoint is based on an application-specific configuration file and the execution time of the data collection is minimized to reduce impact on users;
a capture database that receives the captured information, wherein the capture database receives the captured information via the custom URL submitted to the web server via a subsequent web server request; and
an analysis component configured to:
analyze the captured information for user interactions;
anticipate future user interactions based on the analysis of the captured information;
reconfigure future web pages based on the anticipated future user interactions, and
search for, find, and replace analytics tag values.

2. The system of claim 1, wherein a first analytics tag of the selected set monitors user interaction with a first element of the web page.

3. The system of claim 1, wherein the captured information includes one or more client-side actions.

4. The system of claim 3, wherein the one or more client-side actions comprise at least one client action that is independent of a call to a web server.

5. The system of claim 1, wherein the selected set comprises a default set of analytics tags and a custom set of analytics tags.

6. The system of claim 1, wherein the plurality of analytics tags comprises one or more custom HTML tags.

7. The system of claim 1, wherein the analytics library comprises a JavaScript library that includes JavaScript code associated with the plurality of analytics tags.

8. The system of claim 1, wherein the at least one of performance of or user interactions with the web page comprise at least one of form data, a click event, a hover event, or a touch input.

9. The system of claim 1, wherein the at least one of performance of or user interactions with the web page comprise at least one user action that occurs during an AJAX flow.

10. The system of claim 1, wherein the analysis component determines an appropriate action based at least in part on the captured information.

11. The system of claim 1, wherein the captured information includes one or more user actions and one or more timestamps, wherein each of the one or more user actions is associated with one of the one or more timestamps.

12. A method, comprising:
receiving a web page request from a client computer;
providing the requested web page to the client computer, wherein the requested web page comprises one or more analytics tags;
capturing information including at least one of client side information, performance data associated with the web page, or user interactions with the web page;
dynamically generating a custom URL based on the captured information, wherein the custom URL contains text in the custom URL that indicates the captured information;
providing the captured information to a web server associated with the web page, wherein the web server receives the captured information via the custom URL during a subsequent web page request;
analyzing the captured information for the user interactions;
anticipating future user interactions based on the analysis of the captured information;
reconfiguring web pages based on the anticipated user interactions, and
adding and deleting analytics tags without requiring code changes to an individual application or web page associated with the respective tag,
wherein the captured analytic data includes information associated with the method of user logout.

13. The method of claim 12, wherein the capturing comprises capturing the at least one of client side information, performance data associated with the web page, or user interactions with the web page independent of a web server call.

14. The method of claim 12, wherein the plurality of analytics tags comprises one or more custom HTML tags.

15. The method of claim 12, wherein the capturing comprises capturing the at least one of client side information, performance data associated with the web page, or user interactions with the web page during an AJAX flow.

16. The method of claim 12, wherein the analyzed user interaction is an account interaction associated with an account in a list of accounts and the reconfiguring includes reordering the layout of the web page such that the account is higher on the list of accounts.

17. A method, comprising:
providing a web page comprising a plurality of analytics tags to a client;
invoking code upon page load to perform a one-time scan for analytic data tags, wherein a first analytics tag of the plurality of analytics tags monitors interactions with a first element of the web page;
capturing a first client interaction with the first element of the web page via the first analytics tag;
storing, at the client, first data associated with the first client interaction;
dynamically generating a custom URL based at least in part on the captured client interaction with the web page, wherein the custom URL contains text in the custom URL that indicates the captured information;
incorporating the first data into a subsequent web server request via the custom URL;
analyzing the first data;
anticipating future client interactions based on the analysis of the first data;
reconfiguring future web pages based on the anticipated future client interactions, and
adding or modifying analytics tags independently of the development or release cycle of the application page they are tied to.

18. The method of claim 17, wherein the first analytics tag is linked to the first element via a content management system.

* * * * *